Figure 1:
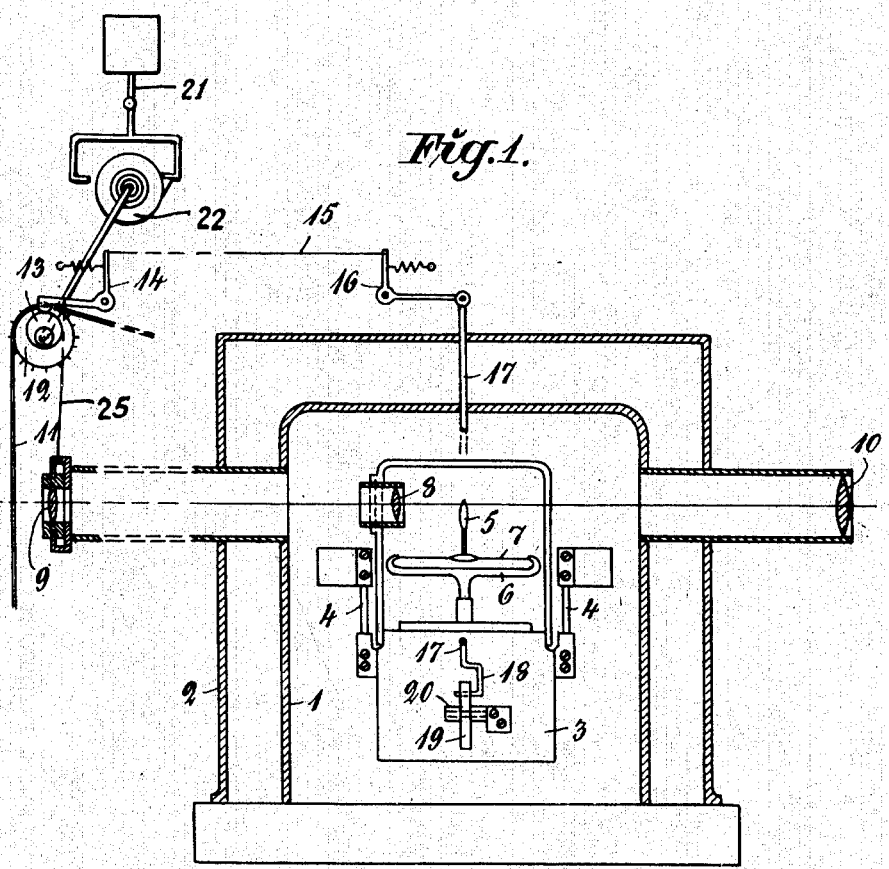

Nov. 12, 1940.  G. A. ISING  2,221,480

GRAVITY MEASUREMENTS

Filed Feb. 11, 1938

G. A. Ising
Inventor

By: Glascock Downing & Seebold
Attys.

Patented Nov. 12, 1940

2,221,480

UNITED STATES PATENT OFFICE 2,221,480

GRAVITY MEASUREMENTS

Gustaf Adolf Ising, Djursholm, Sweden

Application February 11, 1938, Serial No. 190,085
In Sweden February 11, 1937

3 Claims. (Cl. 265—1.4)

The present invention relates to an apparatus for carrying out gravity measurements, said apparatus comprising an astatized pendulum. Astatized pendulums of various construction, adapted to relative gravity measurements, are known for example by the Swedish Patent No. 47,457. A suitable embodiment consists of a vertical quartz rod, which, at its lower end, is secured to the middle of a horizontally stretched quartz fibre, the fibre serving as the elastic turning axis of the pendulum. The invention has for its object to increase the accuracy of such measurements and to facilitate the measuring work. The practical importance of relative gravity measurements has increased considerably during the last few years, in that such measurements have been introduced for prospecting purposes, i. e. for geophysical researches, for instance in search of mineral or oil deposits.

As is well known, the coefficient of restoring force or control of an astatized pendulum is composed of a positive or stabilizing component, as a rule of elastic origin, and of a negative or labilizing component which may be due to the weight of the pendulum only. If the positive component be designated $h$ and the negative component be designated $k$, the resultant control will evidently be $h-k$, and the moment $Q$, which at the pendulum deflection $\delta$ tends to bring the pendulum back to its vertical position, will be $$Q = -(h-k)\delta$$

The degree of astatization is represented by the quotient $$\frac{k}{h-k} = N$$

which quotient may be termed the astatization figure of the pendulum. This figure varies with the gravitational acceleration. In fact, the percentage variation of the control and consequently of the astatization figure is many times greater than the percentage variation of the gravitational acceleration, thus permitting of a very accurate measurement of the changes of gravity. Expressed in a formula: If the acceleration $g$ undergoes a small change $\Delta g$, the astatization figure $N$ is consequently subjected to a change $\Delta N$, which is related to $\Delta g$ as follows:

$$\frac{\Delta N}{N} = (N+1)\frac{\Delta g}{g}$$

the gravity being supposed to have an influence only on the labilizing component $k$ of the control. For a suitable astatization the factor $N+1$ may be of the order of magnitude of 500 to a 1000.

According to the present invention the determination of the relative magnitude or change of the astatization figure $N$ is carried out by bringing the pendulum, through a periodic application of a deviating moment thereto, to deflect symmetrically from its vertical position towards opposite sides at constant intervals of time, so that the elastic lag or after-working in the elastic turning axis of the pendulum will have a constant influence on every reading or recording of the deflection. The deflecting moment may be produced, for instance, by slightly tilting the frame portion supporting the pendulum at equal time intervals by means of a time mechanism, for example a clockwork. The error of measurement caused by the elastic lag will then become practically the same for all readings or recordings. Since the measurements are relative, said error of measurement will therefore be substantially eliminated, resulting in a substantially increased accuracy which is of particular importance in measurements of the accurate nature in view.

The astatization figure $N$ can be directly obtained from the ratio between the angle of tilt $\varphi$ of the pendulum support and the corresponding deflection $\delta$ of the astatized pendulum with respect to its said support, the following relation being true for small angular deflections $$N = \frac{\delta}{\varphi}$$

A further increase of accuracy may be obtained by taking photographic records of the pendulum deflections with a certain time lag in respect to the tiltings of the support under control of the same time mechanism used for effecting the tilting, so that each recording will occur at accurately predetermined intervals of time after the corresponding tilting of the support.

Figure 3:
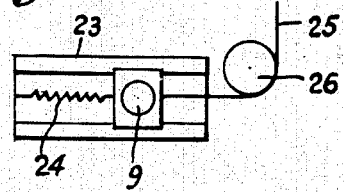
Figure 2:
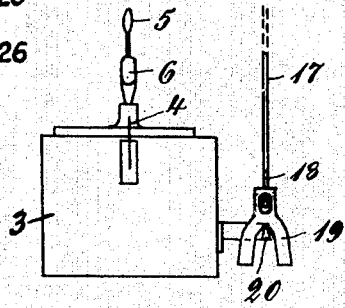
Figure 4:
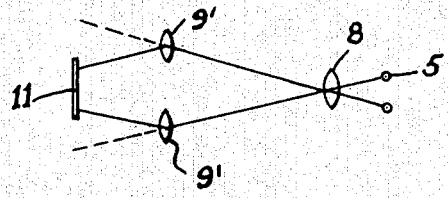

The invention will now be described with reference to the drawing attached to this specification and forming part thereof, in which Figure 1 shows a section of an instrument intended to be used for carrying out the method according to the invention, whereas Figure 2 shows, in another section, the tiltable support for the astatized pendulum. Figures 3 and 4 are diagrammatic views of further modifications of the invention.

The pendulum device is enclosed in a double-walled casing 1, 2, the space between the walls being filled with melting ice or some other medium having a constant temperature. The movable support for the pendulum consists of a block 3 which is suspended by two bands or filaments 4 the upper ends of which are secured to a rigid portion of the frame. The astatized pendulum system 5, 7 may be carried out in the known manner as set forth above consisting of an upstanding pendulum rod 5 elastically mounted by means of the string 7 in the fork shaped holder 6. According to the invention said holder is mounted on the top of the block 3. The pendulum should be comparatively short to obtain a short time of oscillations and at the same time it should be as light as possible so that the air damping will become great. Inserted in the frame right opposite the normal position of equilibrium of the free end of the pendulum is a microscope objective 8, and in line with said objective is arranged an ocular 9. Through a convergent lens system 10 inserted at the opposite side of the frame illuminating light is projected from an outer source of light towards the pendulum point. In front of the ocular 9 a photographic plate or film 11 is movable in a direction upwards. In the example shown a film is used, said film passing over a wheel 12 which is rotated a half revolution at constant time intervals under the control of a clockwork 21 operating a spring actuated ratchet wheel 22 so that the film is advanced step by step. The wheel 12 is provided with an eccentric 13 cooperating with one arm of an angle lever 14 the other arm of which is connected through a wire 15 with an upwardly extending arm on a spring actuated angle lever 16 which is pivoted above the pendulum outside of the casing. Pivotally connected with said angle lever 16 is a vertical rod 17 which extends through an opening in the casing. The lower end of the rod 17 is provided with a hook 18 engaging into a slit or recess in a movable weight 19 which cooperates with a knife edge 20 provided on an arm extending from the block 3. The block 3 is balanced in such a manner that in the absence of the weight the block will tilt slightly towards one side and with the weight hanging on will tilt through the same angle towards the other side. When the wheel 12 occupies the position shown on the drawing, in which the angle lever 14 is displaced clockwise by the eccentric 13, the rod 17 will occupy its lowermost position, the loose weight 19 then resting on the knife edge 20, causing the block 3 to make a slight deflection towards one side in respect to its middle position. On the advancing of the wheel 12 one step that is, a half revolution under the influence of the clockwork, the rod 17 will be raised lifting the weight 19 off the knife edge, resulting in that the block 3 will now tilt through an equal angle towards the other side in respect to its middle position. On each turning of the wheel 12 the photographic film will be advanced one step, and after the lapse of a definite time interval a momentary exposure of the film for instance, by closing the electric circuit for the source of light will be effected by means of the clockwork.

In the shown example the ocular 9 is assumed to be slightly movable parallelly with the deflection of the pendulum point, i. e. at right angles to the plane of the paper in Figure 1, and to be connected with the stepping mechanism in such a manner that upon each deflection of the pendulum the image of the pendulum point will be moved back a certain definite distance towards the optical axis, so that the records of the symmetrical deflections will fall within a comparatively narrow strip of the film. To this end the ocular 9 may be slidably mounted in guides 23, Figures 1 and 3, so as to be movable in horizontal direction and to one end thereof is connected a spring 24 while at the other end is attached one end of a thin wire 25 running over a guide wheel 26 and fastened to the lever 14 so that the ocular will be subjected to a reciprocating movement in synchronism with the tilting movement of the support 3. It is hereby rendered possible to use a rather narrow film. The same object can be attained by providing two fixed oculars, Figure 4, located at opposite sides of the optical axis of the objective 8.

The described embodiment represents merely an example of the invention. The arrangement for effecting the periodical tilting of the pendulum support can be devised in different ways. The arrangement can also be such that the film is moved continuously instead of step by step and independently of the mechanism for the periodical changes of tilting in which case the eccentric 13 is alone driven over the ratchet wheel 22 while the wheel 12 is driven directly by the same or by another clockwork. If desired a stationary film or plate may be used and the ocular 9 may instead be operatively connected with the clockwork by means of a suitable transmission so as to be displaced perpendicularly to the deflections of the pendulum.

I claim:

1. An arrangement for carrying out gravity measurements comprising in combination a tiltable support, an astatized pendulum mounted on said support, a time mechanism, an automatic operating mechanism adapted to tilt said support periodically under the control of said time mechanism so as to cause the pendulum to swing over through its vertical position, and means for determining the deflections of said pendulm.

2. An arrangement for carrying out gravity measurements comprising in combination a tiltable support, an astatized pendulum mounted on said support, a time mechanism, an automatic operating mechanism adapted to tilt said support periodically under the control of said time mechanism so as to cause the pendulum to swing over through its vertical position, means for projecting an image of an indicating point of the pendulum on a light sensitive recording surface and means operating in synchronism with the tilting of said support to bring about a stepwise relative displacement between said light sensitive surface and said image perpendicular to the displacement caused by the pendulum deflection.

3. An arrangement according to claim 2, including means effecting also a lateral displacement of the projected image opposite to its displacement caused by the pendulum deflection, thus permitting the recording of the symmetrical deflections to be effected within a comparatively narrow zone or strip of the light sensitive surface.

GUSTAF ADOLF ISING.